United States Patent
Bergman

(10) Patent No.: US 6,890,010 B2
(45) Date of Patent: May 10, 2005

(54) INTEGRAL BUMPER AND SKID PLATE

(75) Inventor: Ron Bergman, McIntosh, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 131 days.

(21) Appl. No.: 10/215,785

(22) Filed: Aug. 8, 2002

(65) Prior Publication Data

US 2004/0026937 A1 Feb. 12, 2004

(51) Int. Cl.⁷ .......................... B60R 19/48; B62D 25/08
(52) U.S. Cl. .................... 293/117; 296/193.07; 280/28
(58) Field of Search .................... 293/117; 280/69.1, 280/28, 845; 180/190; 296/193.01, 204, 193.07, 193.09, 203.02

(56) References Cited

U.S. PATENT DOCUMENTS

| | | | | |
|---|---|---|---|---|
| 3,698,497 A | * | 10/1972 | Bombardier | 180/190 |
| 3,884,516 A | * | 5/1975 | Gallion et al. | 293/120 |
| 3,989,002 A | * | 11/1976 | Peterson | 114/55.56 |
| 4,826,238 A | * | 5/1989 | Misono et al. | |
| 4,893,692 A | * | 1/1990 | Smith | 180/190 |
| 5,066,067 A | * | 11/1991 | Ferdows | 296/193.04 |
| 5,109,941 A | * | 5/1992 | Thompson | |
| 5,573,299 A | * | 11/1996 | Masuda | 296/193.09 |
| 5,704,644 A | * | 1/1998 | Jaggi | 280/796 |
| 5,957,230 A | * | 9/1999 | Harano et al. | 180/68.4 |
| 5,992,552 A | * | 11/1999 | Eto | 180/190 |
| 6,015,254 A | * | 1/2000 | Keeler | |
| 6,202,778 B1 | * | 3/2001 | Mistry et al. | |
| 2001/0052707 A1 | * | 12/2001 | Johnson et al. | |
| 2002/0050413 A1 | * | 5/2002 | Renault | |
| 2002/0179353 A1 | * | 12/2002 | Robinson | |

* cited by examiner

Primary Examiner—D. Glenn Dayoan
Assistant Examiner—Patricia L. Engle
(74) Attorney, Agent, or Firm—Merchant & Gould, P.C.

(57) ABSTRACT

The present invention generally relates to an integrally formed skid plate and bumper for a motorized vehicle. The integrally formed skid plate and bumper member is particularly useful for a snowmobile. One embodiment of the invention includes a bumper and a skid plate that are integrally formed as a single member and capable of being secured to a vehicle frame. The skid plate may include hollow rib members that extend longitudinally along a downward facing side of the skid plate. The skid plate also may include a roll-up feature at a rear portion of the skid plate that curves upward to mate with a lower portion of the vehicle frame. As applied to snowmobiles, the integrally formed skid plate and bumper may define a nose cone between the bumper and the skid plate.

15 Claims, 5 Drawing Sheets

INTEGRAL BUMPER AND SKID PLATE

BACKGROUND OF THE INVENTION

1. Field of Invention

This invention relates generally to motorized track-driven vehicles. More particularly, the invention relates to a skid plate and a bumper portion of a snowmobile.

2. Related Art

Most snowmobiles implement a bumper on the front end of the vehicle to prevent damage to the vehicle if it engages other objects and to provide additional structure that can be used to manually move the snowmobile. Most snowmobiles also implement a skid plate of some kind to a bottom side of the vehicle to prevent damage to otherwise exposed components that may contact objects over which the snowmobile is passing. Typically, the skid plate and bumper are separately secured to a frame of the snowmobile. It is common in some instances to secure the skid plate to the front bumper in addition to securing the skid plate to the vehicle frame.

A disadvantage of known skid plates and bumpers that are secured to a vehicle frame relates to their assembly. For example, if the skid plate and bumper are separately secured to the vehicle frame, there are multiple members to handle and secure to the frame, which may complicate the assembly process. In configurations where the skid plate and bumper are secured together prior to being mounted to the vehicle frame, the assembly is further complicated by having to align several parts together for proper mounting to the vehicle frame, and adding an additional step to the assembly process. Another disadvantage of securing separate skid plate and bumper members together in addition to securing the combined members to the vehicle is that the bond between the members may fail. A skid plate and bumper for mounting to a vehicle that addresses these and other disadvantages of known skid plates, bumpers and their combinations would be an important advance in the art.

SUMMARY OF THE INVENTION

The present invention generally relates to an integrally formed skid plate and bumper for a motorized vehicle. The integrally formed skid plate and bumper member is particularly useful for a snowmobile. One embodiment of the invention includes a bumper and a skid plate that are integrally formed as a single member and capable of being secured to a vehicle frame. The skid plate may include hollow rib members that extend longitudinally along a downward facing side of the skid plate. The skid plate also may include a roll-up feature at a rear portion of the skid plate that curves upward to mate with a lower portion of the vehicle frame. As applied to snowmobiles, the integrally formed skid plate and bumper may define a nose cone between the bumper and the skid plate.

The above summary of the present invention is not intended to describe each disclosed embodiment or every implementation of the present invention. The figures and the detailed description that follows more particularly exemplify these embodiments.

BRIEF DESCRIPTION OF THE DRAWINGS

The invention may be more completely understood in consideration of the following detailed description of various embodiments of the invention in connection with the accompanying drawings, wherein like numerals represent like parts throughout several views, in which.

Figure 1:
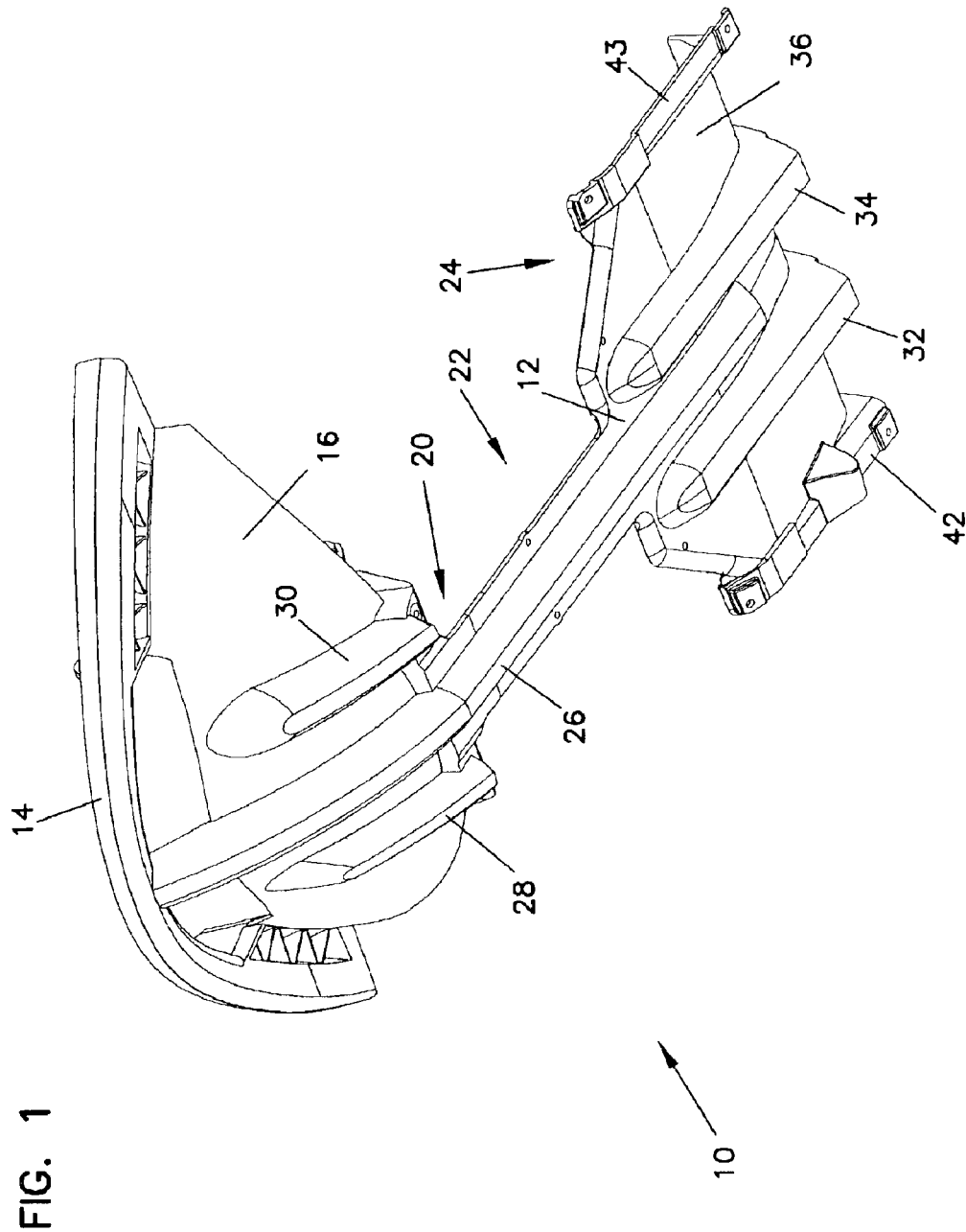
FIG. 1 is a bottom perspective view of an integral bumper and skid plate member, according to the invention.
Figure 2:
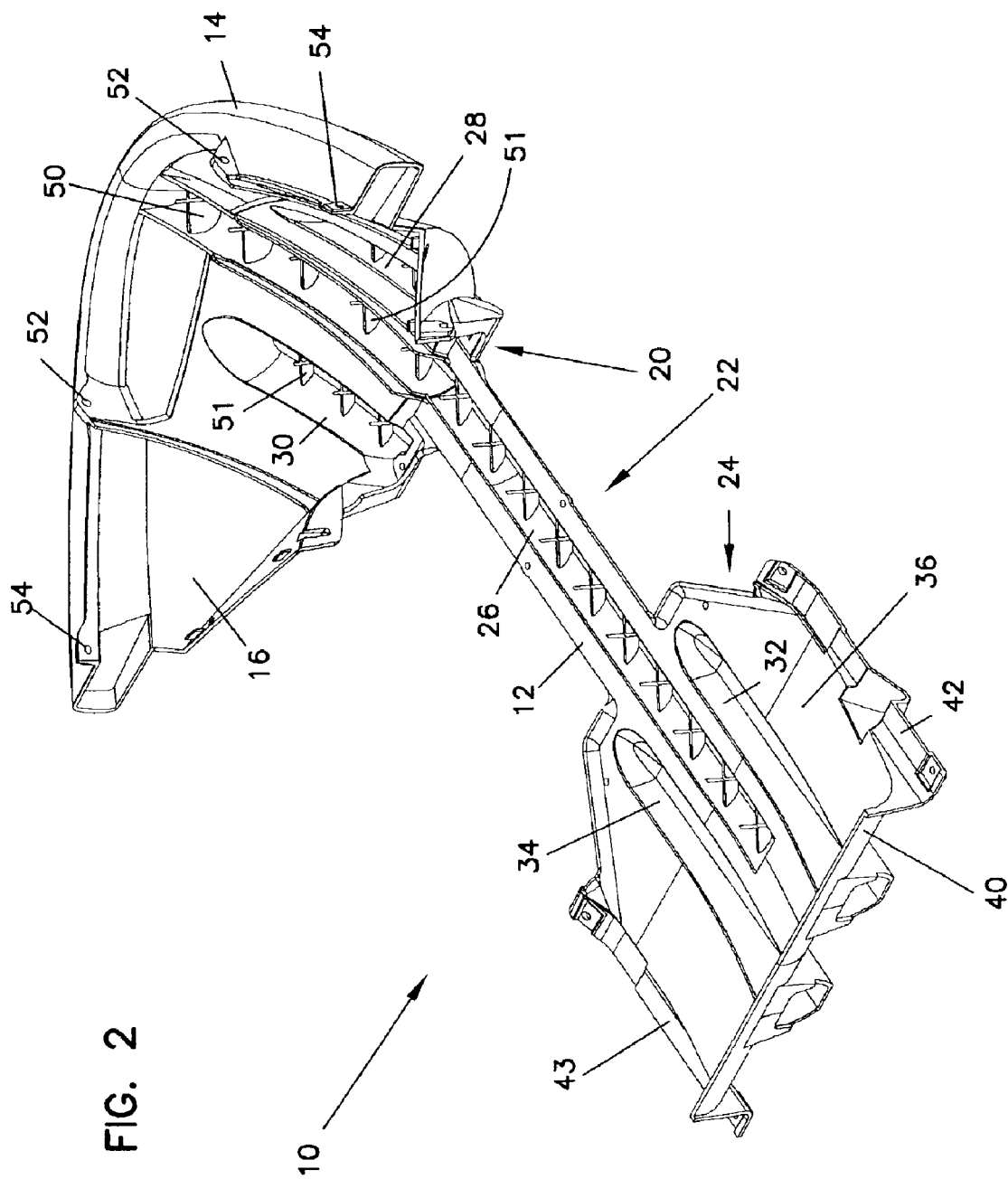
FIG. 2 is a top perspective view of the integrally formed member of FIG. 1.
Figure 3:
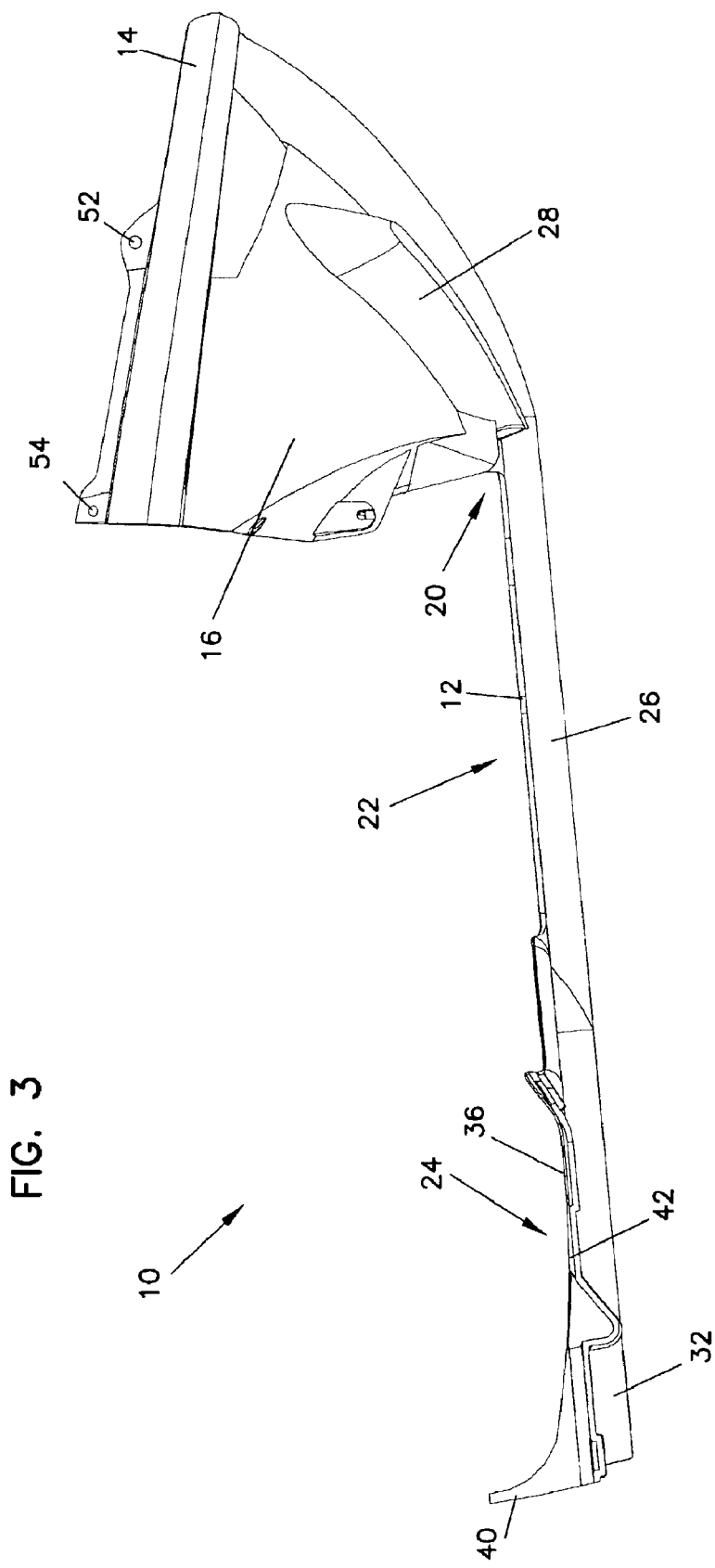
FIG. 3 is a side view of the integrally formed member of FIG. 1.
Figure 4:
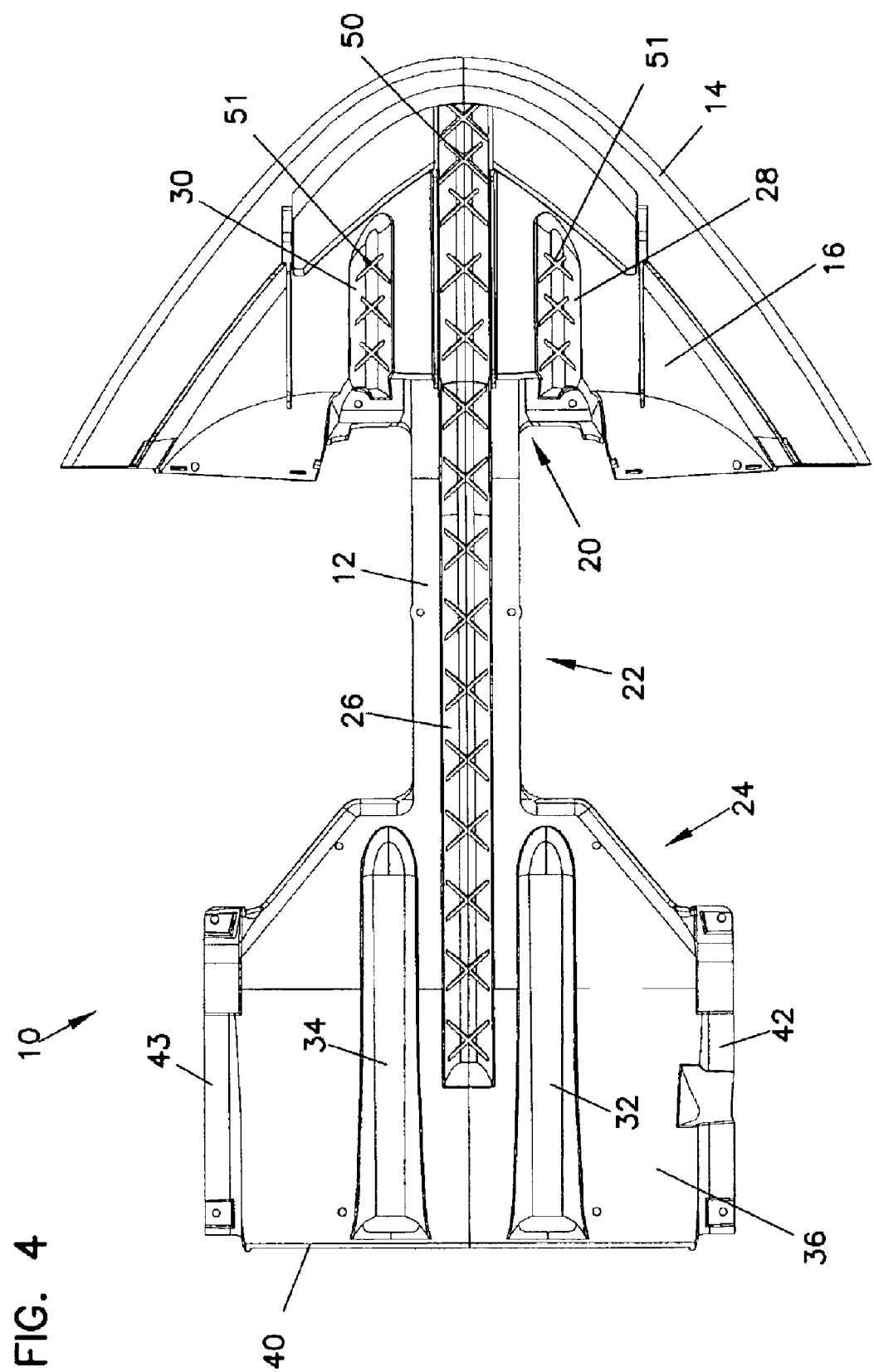
FIG. 4 is a top view of the integrally formed member of FIG. 1.

While the invention is amenable to various modifications in alternative forms, the specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present invention is believed to be applicable to skid plates and bumpers for a snowmobile. In particular, the present invention is directed to an integrally formed bumper and skid plate member that is capable of being secured to a snowmobile frame. The skid plate may include hollow rib members and, together with the bumper, define a nose cone of the vehicle.

One example of an integrally formed member 10 of the present invention includes a skid plate 12, a bumper 14, and a nose cone 16, as shown in FIGS. 1–6. Although the integrally formed member 10 shown in FIGS. 1–6 includes a front bumper, nose cone and skid plate, alternative embodiments of the present invention may be limited to a skid plate and a bumper integrally formed together.

Skid plate 12 includes a front portion 20, a center portion 22, and a rear portion 24 that are typically oriented to match the front and center portions of a snowmobile to which member 10 is attached. Skid plate 12 may include a center rib 26, first and second front ribs 28 and 30, and first and second rear ribs 32 and 34 (referred to herein as "ribs 26–34"). All of the rib members are formed on a base member 36 on an exterior surface of skid plate 12 so that they face downwardly toward a surface over which the vehicle is traveling. Rib members 26–34, according to the illustrated embodiment, may be hollow. Ribs 26–34 may be hollow to reduce the overall weight of member 10 while maintaining the necessary structural integrity to withstand failure. In other embodiments, ribs 26–34 may be solid rather than hollow.

Ribs 26–34, when formed as hollow members, also may include cross-support members. Cross-support members 50 and 51 are positioned within the hollow area of the center rib and the front ribs, respectively. Cross-support members may provide additional structural support for the ribs, particularly at the front and center portions of the skid plate, which can be most susceptible to damaging forces.

Figure 5:
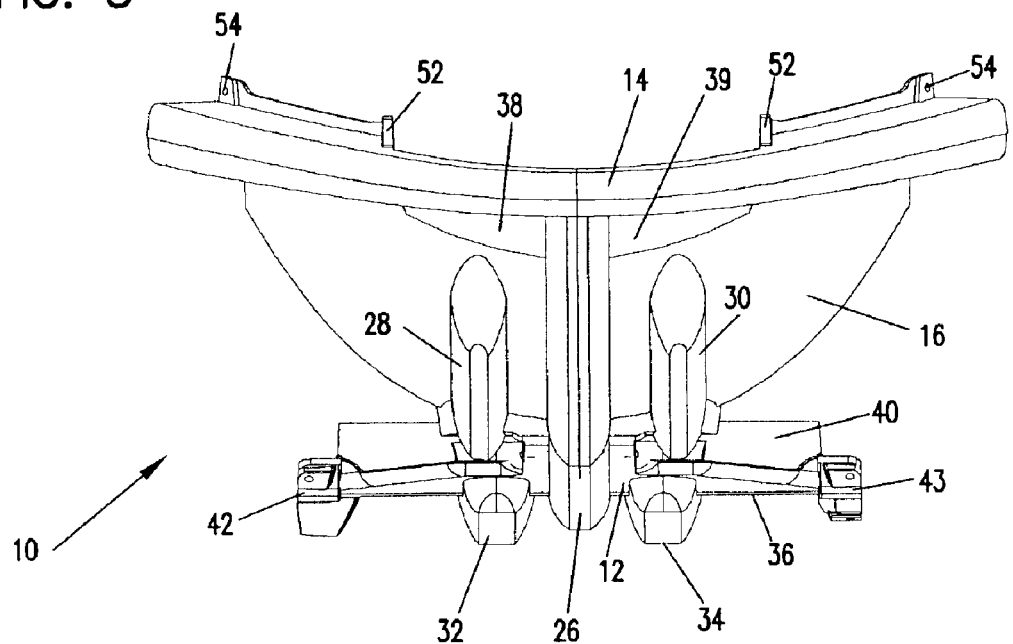
FIG. 5 is a front view of the integrally formed member of FIG. 1.
Figure 6:
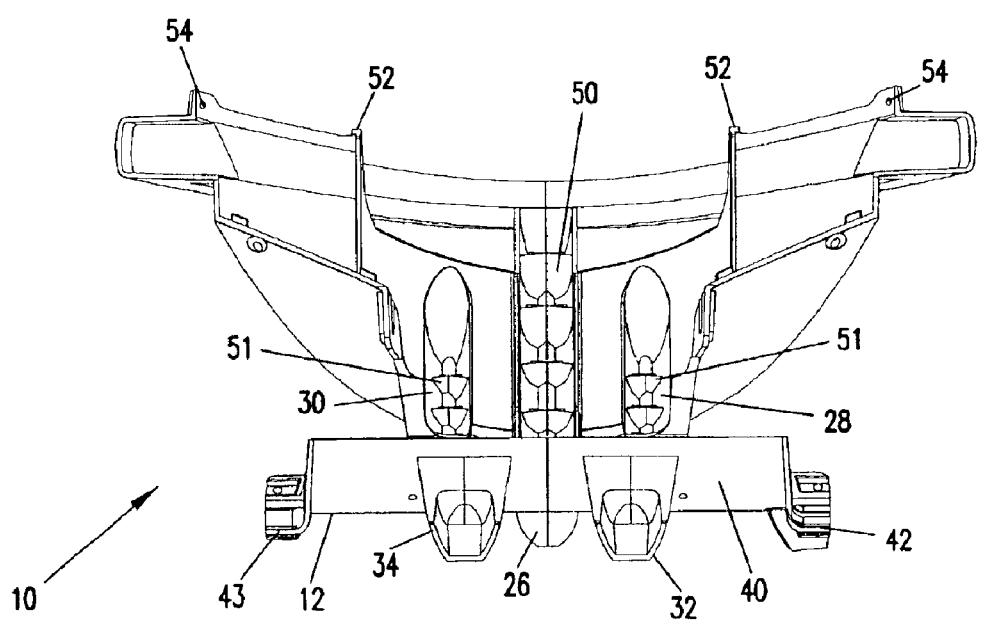
FIG. 6 is a rear view of the integrally formed member of FIG. 1.

The front view of FIG. 5 illustrates bumper 14, nose cone 16 with openings 38 and 39, and skid plate 12 with rib members 26–34 shown in part. The rear plan view of FIG. 6 illustrates a roll-up portion 40 of skid plate 12 and further illustrates the position of ribs 26–34 and frame engagement members 42 and 43 formed on opposite sides of skid plate 12.

Roll-up portion 40 may be rounded or curved relative to base member 36 and extends generally upward to meet a lower portion of the snowmobile frame. Snowmobile frames typically include opposing side members at a rear portion of the frame that form a "tunnel" in which an endless track travels to move the vehicle. Rollup portion 40 may, in part, act as a shield or the like for protecting the lower portion of the frame from objects that contact the vehicle near the location of roll-up portion 40. In one embodiment of a snowmobile implementing integrally formed member 10, the lower portion of the frame is a portion of a radiator made of aluminum, and roll-up portion 40 functions in part to protect the radiator from being damaged.

Skid plate 12 may include mounting members 42 and 43 that are configured to attach to the side members of the snowmobile frame. The mounting members may include apertures or bores for receiving a fastener to secure member 10 to the snowmobile frame. The mounting members may also be raised relative to base member 36 so that the mounting members act as additional rib features on the skid plate.

Nose cone 16 is conical in shape, defining a front or nose portion of the snowmobile. Typically, hood attachment features 52 and 54 are positioned near the front of member 10 for securing and pivoting a hood or covering to the vehicle to cover an engine of the vehicle, or for attaching some other feature of the vehicle. Attachment features 52 and 54 may be positioned on or near bumper 14 so that a hood mounted to attachment features 52 and 54 are partially protected by bumper 14. Openings 38 and 39 in nose cone 16 provide ventilation into an engine area of the snowmobile frame and may also provide a handhold for manually moving a snowmobile to which member 10 is secured.

In alternative embodiments of member 10, skid plate 12 is generally rectangular in shape rather than the generally I-shaped skid plate of FIGS. 1–5. In other embodiments, skid plate 12 may have a variety of different shapes and sizes, typically to match an underside of a vehicle frame to which the member 10 is attached. Also, as mentioned above, member 10 may be configured without a nose cone 16 and thus provide for a bumper formed with the skid plate alone. In such an embodiment, member 10 may additionally include support features that extend between the skid plate and portions of the bumper.

Member 10 may be made of a variety of different materials, for example, metal, metal alloys, polymer materials, or the like that may be cast, stamped, or injection molding, as the case may be for a given material. In one example of the present invention, integrally formed member 10 is injection molded out of a high-density polyethylene material (HDPE). HDPE is known for its qualities of strength and durability as well as being relatively light in weight and inexpensive to form. An additional benefit of using HDPE is the ease in which it may be formed into relatively complicated shapes when injection molding, for example, the hollow rib members of the present invention. HDPE and similar polymer based materials also provide the benefit of being more shock absorbing than a metallic material. This quality is ideal for use in the bumper portion 14 of the present invention, but is also advantageous for use as a skid plate in that the material is somewhat deformable and may be able to absorb shock forces without permanent deformation or failure of the member. HDPE also has the property of being relatively slippery (inherent lubricity) in comparison to materials commonly used for skid plate, which would be advantageous for use in snow conditions. Another advantageous property of HDPE for snowmobile applications is that in make it less likely for ice or other materials to collect or form on the surface of HDPE.

Integrally formed member 10 may be composed of several different materials that are integrally formed. For example, skid plate 12 may have a metallic core that is covered with a polymer-based material such as HDPE. This combination of materials may increase the strength of skid plate 12 while maintaining some of the advantages of HDPE, such as reduced weight. Member 10 may also include, for example, structural support members that extend between skid plate 12 and bumper 14 that are embedded in member 10, such as by casting or injection molding a material on the outside surfaces of the structural members. Regardless of the method of forming member 10, or the shape and design of its various components, member 10 must be integrally formed as a single piece capable of mounting to a snowmobile frame.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An unitary bumper and skid plate member for a land based vehicle, comprising:
   a bumper; and
   a skid plate;
   whereby the bumper and the skid plate are integrally formed as one unitary piece capable of being secured to a frame of the vehicle.

2. The member of claim 1 further comprising protective ribs formed on an exterior surface of the member.

3. The member of claim 2 wherein the ribs are hollow.

4. The member of claim 2 wherein at least one of the ribs extends from the bumper to the skid plate.

5. The member of claim 1 wherein the skid plate has a base member and a rear portion, the rear portion comprising a roll-up portion that is curved relative to the base member and extends transverse to a length of the skid plate substantially centered about a longitudinal centerline of the skid plate.

6. The member of claim 5 wherein the roll-up portion curves up to meet a lower portion of the vehicle frame.

7. The member of claim 1 wherein the member is injection molded as one piece and comprises high-density polypropylene.

8. The member of claim 1 wherein the member comprises attachments for securing and pivoting a hood to the vehicle.

9. The member of claim 8, wherein the attachments are secured to the bumper.

10. The member of claim 2 wherein the ribs are hollow and comprise cross supports formed in the ribs.

11. The member of claim 1 wherein the bumper is a front bumper of the vehicle.

12. The member of claim 11 further comprising a nose cone interposed between the front bumper and the skid plate, wherein the nose cone is integrally formed with the skid plate and the front bumper to form a single unitary member.

13. The member of claim 1 wherein the skid plate comprises a front end and a rear end, and wherein the bumper comprises a front bumper integrally formed at the skid plate front end and a rear roll-up portion integrally formed at the skid plate rear end, the bumper and skid plate forming a single unitary member.

14. A snowmobile, comprising:
   a frame; and
   an unitary bumper and skid plate member mounted to a bottom portion of the frame, the integral bumper and skid plate member including a bumper and a skid plate integrally formed as one unitary piece.

15. An unitary bumper and skid plate member for a land based vehicle, comprising:
   a bumper defining a front edge of the vehicle; and
   a skid plate;
   whereby the bumper and the skid plate are integrally formed as one unitary piece capable of being secured to a frame of the vehicle.

* * * * *